J. H. JENSEN.
TRANSMISSION GEARING.
APPLICATION FILED JULY 16, 1912.

1,108,582.

Patented Aug. 25, 1914.

Witnesses:
Kate Duggan
Eva Cayley

Inventor:
Jens H. Jensen
By Millard Eddy, Atty.

UNITED STATES PATENT OFFICE.

JENS H. JENSEN, OF MINDEN, NEBRASKA.

TRANSMISSION-GEARING.

1,108,582.  Specification of Letters Patent.  Patented Aug. 25, 1914.

Original application filed May 16, 1904, Serial No. 208,292. Divided and this application filed July 16, 1912.
Serial No. 709,626.

*To all whom it may concern:*

Be it known that I, JENS H. JENSEN, of Minden, in the county of Kearney, in the State of Nebraska, have invented certain new and useful Improvements in Transmission-Gearing, and have described the same in the following specification, illustrated by the accompanying drawings.

My invention relates to transmission gearing of that class in which gearing members are locked interchangeably for the production of different speeds. It is especially designed to be used in connection with self feeders and band cutters for threshing machines, as illustrated in Letters Patent No. 1,033,901, which were issued to me July 30, 1912; but is likewise applicable to self-propelling vehicles and to other kinds of machinery requiring instantaneous changes of speed.

The principal objects of the invention are to simplify the construction of a gearing of this class, to render its speed changes instantaneous, to maintain the meshing of the gears without interruption, to avoid stripping the gears, and in general to produce a superior transmission gearing of the specified class.

To accomplish these objects I incorporate in my improved transmission gearing a driving gear having two concentric courses of gear teeth, a driven gear of like description, a pinion shaft, loose pinions thereon engaging the gear courses respectively, and sliding clutch members for locking the pinions to the pinion shaft.

The drawings show the best manner in which I have contemplated applying the principles of the invention; yet the latter is not restricted to any specific arrangement or construction of parts, excepting as limitations of that kind are either expressed or necessarily implied in the subjoined claims.

Figure 1:
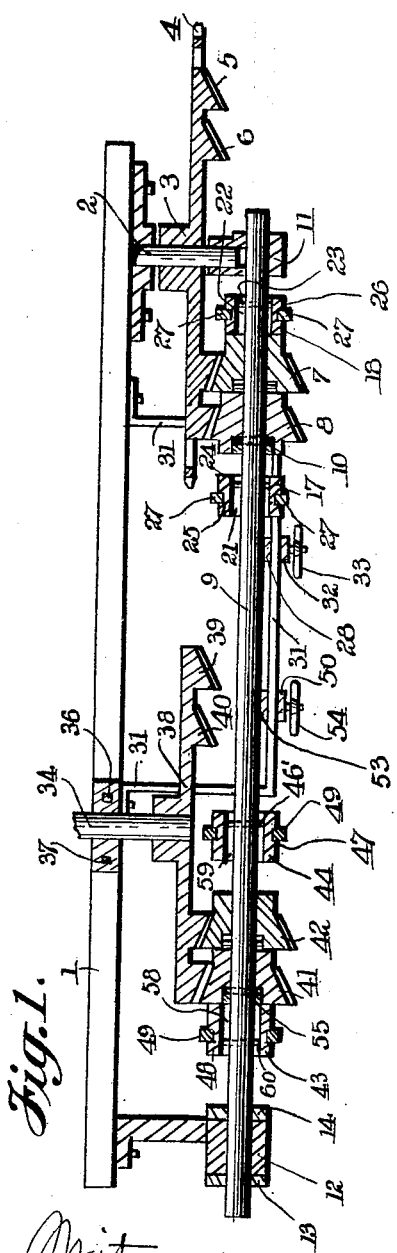
Figure 2:
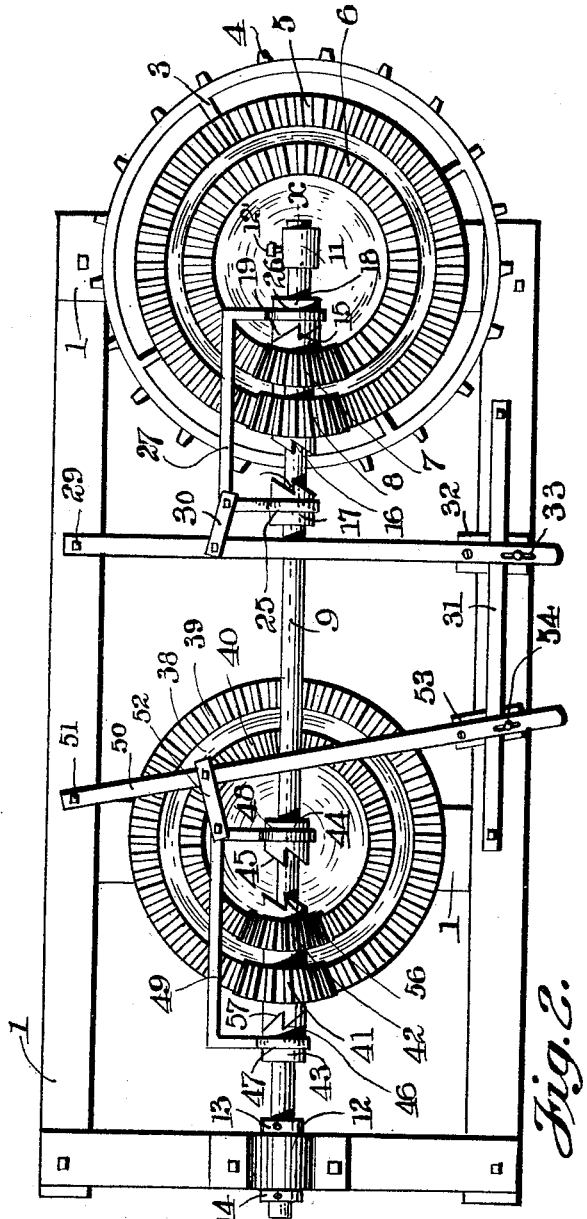

Figure 1 is an elevation of a transmission gearing which is constructed in accordance with these principles. Fig. 2 is a horizontal section on the section line *x—x* in Fig. 1.

In the illustrative transmission gearing which is exhibited in these drawings, the driving gear, driven by an engine or other motor, is denoted by the numeral 3. It is mounted to rotate upon a horizontal stud axle 2 projecting from the frame 1 and is provided with concentric courses of beveled gear teeth, 5 and 6, and peripheral sprocket teeth 4. The driven gear 38 has likewise two concentric courses, or rings, of beveled gear teeth, namely the course 39, equal in diameter to the course 5, and the course 40 smaller in diameter than the course 6. The gear 38 is keyed on the shaft 34, the latter being journaled in the bearing 35 secured to frame 1 by the bolts 36 and 37, and being either extended through the self feeder and band cutter, as in the patent application which is above identified, or attached operatively to other kinds of machinery to which changeable speeds are to be transmitted. The pinion shaft 9 is journaled in the bracket 12 extended from the frame 1 and in the box bearing 11 which is fastened on the free end of the stud axle 2 by the set-screw 12'. The same is prevented from moving endwise by the collars 13 and 14. On this shaft are loosely placed the several free beveled pinions 7, 8, 41 and 42, meshing constantly with the several gear courses 6, 5, 39 and 40 respectively, and held up to their working engagement therewith by the stop pins 55, set through the shaft. The sliding clutch blocks 17, 18, 43 and 44, are keyed to the same shaft by the pins 24, 23, 60 and 46', working respectively in the longitudinal slots 22, 21, 58 and 59, within those blocks. The latter are provided with the terminal clutch teeth 20, 19, 46 and 45', which are adapted to engage selectively the terminal clutch teeth 15, 16, 57 and 56 formed on the pinions respectively. The clutch blocks 17 and 18 are either brought alternatively into engagement with the pinions 8 and 7 respectively, or are disengaged from both of them, by means of a hand lever 28, which is fulcrumed on the pivot bolt 29 and is held in the requisite positions of adjustment by the clamp 32 operated by the thumbscrew 33 to engage the stationary locking bar 31. This lever is attached by the link 30 to the coupling yoke 27 which has terminal forks denoted by the same numeral and occupying the circumferential grooves 25 and 26 in the clutch blocks 17 and 18, which rotate freely with the pinion shaft. In a similar manner the clutch blocks 43 and 44 are either disengaged from both of the pinions 41 and 42, or are caused to engage them alternatively, by manipulation of the like hand lever 50, which is fulcrumed on the pivot bolt 51 and is set in the requisite positions of adjustment by the attached clamp 53, operated by the setscrew 54 to engage the same bar 31, and is attached by the link 52 to the yoke 49 having the terminal forks occupying the peripheral grooves 47 and 48 in these blocks. According to the positions given to the levers 28 and 50, therefore, the transmission of power from the driving gear 3 to the driven gear 38 may be wholly interrupted or may produce in the driven gear alternatively any one of four different speeds as may be desired, namely, the speed imparted thereto by either of the pinions 41 and 42 as driven at the speed of either of the pinions 7 and 8.

I claim as my invention—

1. A transmission gearing of the specified class, comprising a driving gear mounted on a stud axle and having peripheral sprocket teeth as well as concentric courses of beveled gear teeth, a driven gear having concentric courses of beveled gear teeth, a shaft journaled in a box bearing on the free end of the stud axle, a plurality of free beveled pinions, rotatable on the shaft, and meshing constantly with the courses of gear teeth respectively, a plurality of clutch blocks rotatable with the shaft and slidable thereon to engage the pinions respectively, and yokes engaging the clutch blocks in pairs for the purpose of sliding those blocks into and out of engagement with their respective pinions.

2. A transmission gearing of the specified class, comprising a driving gear mounted on a stud axle and having peripheral sprocket teeth as well as concentric courses of bevel gear teeth, a driven gear having concentric courses of bevel gear teeth, a shaft journaled in a box bearing on the free end of the stud axle, a plurality of free beveled pinions severally rotatable on the shaft, and meshing constantly with the courses of gear teeth respectively, a plurality of clutch blocks rotating constantly with the shaft, and slidable thereon, yokes for sliding the clutch blocks in pairs into and out of engagement with their respective pinions, and means for operating the yokes independently of each other.

3. A transmission gearing of the specified class, comprising a driving gear mounted on a stud axle and having two concentric courses of beveled gear teeth, a driven gear having two concentric courses of beveled gear teeth, a shaft journaled in a bearing on the end of the stud axle, two pairs of beveled pinions rotatable severally on the shaft, and meshing constantly with the teeth of the driving and the driven gears respectively, two pairs of clutch blocks rotating constantly with the shaft and slidable thereon, yokes for sliding the clutch blocks in pairs into and out of engagement with their respective pinions, pivoted levers linked to the yokes respectively, and means for locking the levers severally in alternative positions.

In testimony whereof I hereto set my signature in the presence of two witnesses.

JENS H. JENSEN.

Witnesses:
 VAL JENSEN,
 EDWIN CURTIS.

---

Copies of this patent may be obtained for five cents each, by addressing the "Commissioner of Patents, Washington, D. C."